Dr. Z. Castaline,
Portable Fence.

No. 71697

PATENTED
DEC 3 1867

Inventor,
Dr. Ziba Castaline

Witnesses
J. Hevlines
Frank S. Alden

United States Patent Office.

ZIBA CASTALINE, OF BACONSBURG, OHIO.

Letters Patent No. 71,697, dated December 3, 1867.

IMPROVEMENT IN PORTABLE FENCE.

The Schedule referred to in these Letters Patent and making part of the same.

TO ALL WHOM IT MAY CONCERN:

Be it known that I, ZIBA CASTALINE, of Baconsburg, in the county of Trumbull, and State of Ohio, have invented certain new and useful Improvements in Portable Fence; and I do hereby declare that the following is a full and complete description of the same, reference being had to the accompanying drawings, making a part of this specification, in which—

Figure 1:
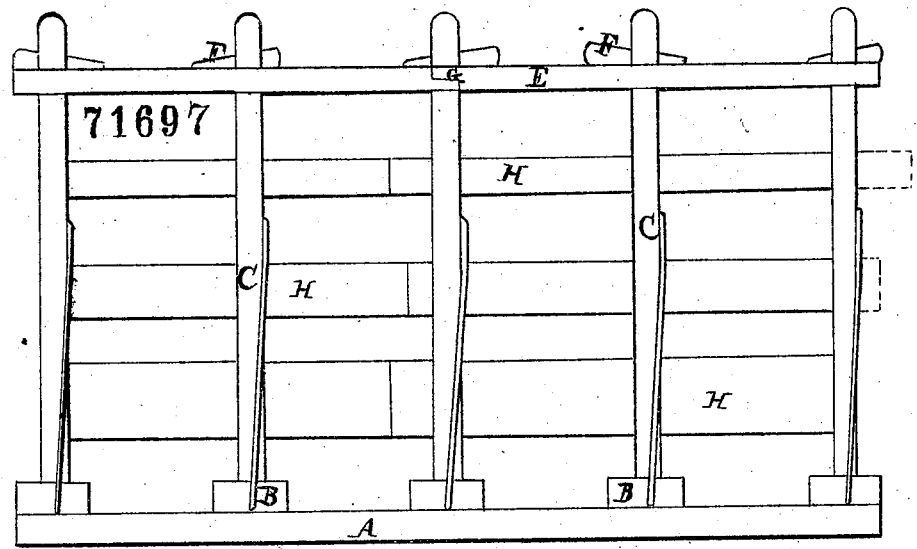

Figure 1 is a side view of the fence.

Figure 2:
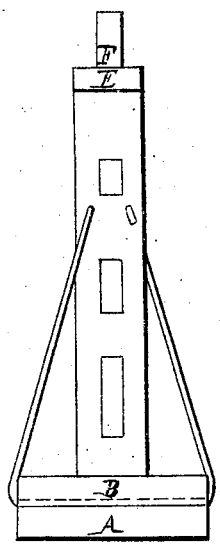

Figure 2, a view of the end.

Like letters of reference refer to like parts in the views.

In fig. 1, A represents the ground on which are laid the stone sills B. On these sills are placed the posts C, supported laterally by the braces D, which are made of rod iron looped around under the sills, and the ends then carried up and driven into the posts, as shown in fig. 2. By thus looping the braces around under the sills, greater strength and security are given to the braces and fence than if they were fastened to the sills by being let into them, or secured in any other way. E, the top rail of this fence, is laid flatwise, as shown in fig. 2, the ends of the post being projected through it and secured by a wedging-key, F, by which the rail is made to fit hard down upon the shoulders. The ends of the rails are halved and made to lap by each other, which are then secured by clamps, as shown at G, fig. 1. The bars H are not fixed in the mortise of the post, but fitted loosely, the ends of each line of bars being made to fit in one hole, and projected through the post, so that they will lap by each other, as shown in fig. 1. By this means the bars can be shoved longitudinally through the post, so that they can be moved out of the way, and thereby allow the passage of animals from one field to another, and by knocking out the keys F, and removing the upper rail, a passage-way is readily made for wagons, &c., or for the removal of the fence, which may be done in sections.

What I claim as my improvement, and desire to secure by Letters Patent, is—

The herein-described fence, when constructed and arranged in the manner substantially as set forth.

ZIBA CASTALINE.

Witnesses:
    D. D. MARVIN,
    G. B. HAYDEN.